United States Patent Office 3,481,745
Patented Dec. 2, 1969

3,481,745
CAKE DOUGHNUT MIXES
Alvin F. Borer, Minneapolis, and John R. Dixon, Brooklyn Park, Minn., assignors to International Milling Company Inc., Minneapolis, Minn., a corporation of New York
No Drawing. Filed July 20, 1966, Ser. No. 566,479
Int. Cl. A21d 13/08
U.S. Cl. 99—92                                                20 Claims

ABSTRACT OF THE DISCLOSURE

Cake doughnut mixes and bases and the method of making cake doughnuts that includes incorporating rye flour to improve the keeping and eating qualities of cake doughnuts. It is preferred that the amount of rye used be between about 18% to 31% of the total rye and wheat flour used; and on a fully prepared mix basis from about 11% to 19% rye flour be used. By incorporating rye flour in the mix, a number of different types of wheat flours that do not produce satisfactory results in conventional cake doughnut formulas can be used.

---

This invention relates to improved mixes and bases for making doughnuts. More particularly this invention relates to cake doughnut mixes and bases containing rye flour and, with or without, additional quantities of emulsifiers to provide improved eating and keeping qualities of the doughnuts made therefrom.

It is conventional to use specially selected wheat flour for making cake doughnuts. Since no statisfactory physical or chemical tests are available for testing wheat to determine what wheat will make a good flour for use in making cake doughnuts, the present practice is to (1) select samples of wheat, make flour therefrom, and after using this flour to make cake doughnuts, the doughnuts are evaluated to determine if the selected wheat flour will make a satisfactory doughnut; or (2) buy a number of different wheat flours, make various blends, test the respective blends by making cake doughnuts and evaluating the doughnuts, thus continuing until a satisfactory blend has been found. A large amount of testing is involved since, for example, the wheat grown in one county may make a satisfactory cake doughnut while that grown in an adjacent county will not.

Additionally, using conventional formulas, a number of different types of wheat flour will not produce a satisfactory cake doughnut. Examples are soft white wheat and hard spring wheat flours.

Also, with conventional cake doughnut mixes, it would be desirable to increase the amount of emulsifier used since, if increased amounts of emulsifiers, within limits, could be used, a better eating quality doughnut should be obtained. However with conventional cake doughnut mixes, if the amount of emulsifier is increased, the amount of fat absorption during the frying step is increased. Such increased fat absorption is not desirable because it reduces the taste appeal of cake doughnuts. For example, for a dozen of 11-12 ounce doughnuts, a desired level of fat absorption is about 2 ounces. Further with conventional cake doughnut mixes, if too much emulsifier were used, the resulting cake doughnut frequently is poorly shaped and of poor eating quality.

In order to overcome problems and limitations of the aforementioned nature, this invention has been made.

An object of this invention is to provide an improved cake doughnut mix or base to obtain cake doughnuts having increased tenderness, better eating qualities and increased shelf life. Another object of this invention is to provide an improved cake doughnut mix that will tolerate incorporating higher percentages of emulsifiers in making cake doughnuts than conventional doughnut flours and thereby increase the tenderness and keeping quality of cake doughnuts made therefrom while maintaining fat absorption within desired limits.

An additional object of this invention is to provide an improved cake doughnut mix for making cake doughnuts having enhanced softness and moistness. A still another object of this invention is to provide an improved doughnut mix or base for making cake doughnuts that during the frying step absorb substantially less fat than those made from conventional doughnut mixes having the same amount of emulsifier.

Other and further objects are those inherent in the invention herein described and claimed, and which will be apparent as the description proceeds.

Rye flour has very little gluten forming protein and thus if only a flour made from rye were used in making doughnuts, the doughnuts would not rise. However we have found that by using a limited amount of rye flour in conjunction with wheat flour in an otherwise conventional cake doughnut formula, there are obtained cake doughnuts of marketable quality that have improved tenderness and improved storage qualities. The improved storage qualities of cake doughnuts made from a formula that includes limited amounts of rye flour over those that do not include rye flour becomes more readily apparent after about 48 hours of storage. For example, where a new stock of cake doughnuts is received and placed on the shelf, it may be left on the shelf for a period such as six days before the unsold ones are replaced with a new delivery. Thus, extended shelf life (storage qualities) in many retail establishments is important since it is desirable that those doughnuts sold, for example, on the fifth day, have as nearly as possible the tenderness and eating qualities as those sold the first day.

Further it has been found that using limited quantities of rye flour in place of corresponding quantities of white wheat flour in an otherwise conventional cake doughnut formula, the frying properties of the cake doughnuts made therefrom were not impaired (i.e., gas retention, break, rise time, structural formation, dough flow, viscosity and fat absorption), when fried in an automatic frying machine. Also the below listed properties were enhanced by the incorporation of rye flour with no other change in formula:

(1) Tenderness and eating quality of the finished doughnut were relatively improved on the basis of taste panel acceptance scores wherein doughnuts were scored a number of days after making.
(2) Softness and moisture also were enhanced.
(3) Water absorption of the mix to give a batter of equal viscosity was increased.
(4) Absorption of frying fat was reduced.
(5) Formula cost was reduced as rye flour is less costly than wheat flour.

Also by using a limited quantity of rye flour, it has been found that more emulsifiers can be tolerated without excess fat absorption to thereby further improve the eating and keeping quality.

Additionally in prior art doughnut mixes, only specially selected wheat flours could be used to make satisfactory cake doughnuts. However by using a blend of rye flour with other wheat flours in accordance with this invention, wheat flours that previously could not be used for producing a satisfactory cake doughnut, now can be blended in with rye flour and such a blend used in making a satisfactory cake doughnut. For example, soft white wheat and hard spring wheat flours without any rye flour being mixed therewith do not produce a satisfactory cake doughnut.

Fully prepared conventional cake doughnut mixes and the mixes of this invention on a fully prepared mix basis include the following:

|  | Percent |
| --- | --- |
| Flour | 58–62 |
| Sugar | 20–30 |
| Shortening | 3–5 |
| Egg (solids) | 0.5–3 |

It has been discovered that in making cake doughnuts that levels of rye flour that are between about 6% to 40% of the total rye and wheat flours perform satisfactory in accordance with this invention and it is preferred that levels of rye flour between about 18% to 31% be used. On a fully prepared mix basis, it has been discovered that from about 3.7% to about 25% rye flour perform satisfactory, and that it is preferred that from about 11% to 19% rye flour be used. It is further preferred that light and white rye flour be used instead of darker grades because of odor and flavor. That is, white rye flour and light rye flour have less characteristic rye flavor than the darker grades and do not impart the usually commercially undesirable dark cast to the doughnut crumb.

In general the invention comprises improved doughnut bases prepared by blending wheat and rye flours, shortening, an emulsifier, milk solids and chemical leavening agents. The bases may also include other ingredients such as sugar, salt, egg solids, coloring and flavoring agents, preservatives, small quantities of other edible flours to provide desired flavor and taste qualities and the like. Commercial bakeries frequently prefer that the such other ingredients such as salt, coloring agents and other flours such as soy and potato flour be incorporated in the base, while some bakeries prefer that the purchased bases do not include such as sugar and/or egg solids or egg yolks but rather add these ingredients at the time the batter is made from the purchased base.

The shortening may be conventional cake doughnut shortenings such as those made from animal or vegetable oil or plastic types. The chemical leavening agents are those conventionally used in cake doughnut mixes which usually include sodium bicarbonate in combination with various acid ingredients such as sodium aluminum phosphate, sodium acid pyrophosphate, tartaric acid, fumaric acid and etc. The emulsifiers contain one or more compounds such as mono- and diglycerides of fat forming fatty acids, propylene glycol fatty acid esters, lecithin, polysorbate and the like.

In each of the examples set forth hereinafter, a series of bases were made of the respective composition set forth under "Ingredients of Base" in the table for the respective example. The indicated "Ingredients" were admixed and then the components indicated under "Added to Base" for the respective run was admixed with the given base in the series to provide a batter. The amount of the components (Added to Base) is expressed in percentage of the component to the total Base containing the percentages of and the ingredients indicated the heading "Ingredients of Base." For each run the amount of water added was that required to produce a batter of a given viscosity.

The batter for each run was processed in a conventional doughnut machine, i.e., a machine sold under the trademark of "DCA Lincoln Donut Machine" mounted on a Toledo Platform Scale to obtain an accurate measurement of fat absorption. The frying conditions, i.e. temperature of the fat, the length of time in the machine and etc., for the runs of each example were the same.

Five dozen doughnuts were fried for each run (or each Run A Series and Run B Series), the "Fat Absorption" for each run being derived by dividing the ounces of fat absorbed by five dozen doughnuts by five to give the ounces of fat absorbed per dozen. The amount of fat absorbed per dozen for each run is indicated under the heading "RESULTS."

The "Height" was obtained for each run by placing six fried doughnuts of the run, one on top of the other, the "Height" being expressed in millimeters per half dozen. Similarly for "Spread," six fried doughnuts were placed lengthwise in end to end abutting relationship and the length of six doughnuts in this relationship was measured.

In order to obtain "Specific Volume," six fried doughnuts were weighed, placed into a rape seed displacement apparatus and the amount of rape seeds the doughnuts displaced were recorded. The weight of the doughnuts was then divided into the volume of rape seed and the "Specific Volume" obtained.

As the doughnuts were fryed, the physical characteristics of the doughnuts were observed. The "Performance" indicates the evaluation of the frying characteristics. The performance of run was scored on the basis of a conventional scoring procedure, the scoring appearing in the horizontal column designated "Performance" wherein the symbols used are as follows: "V.G."=very good; "G"=good; "F"=fair; "P"=poor.

Also a dozen doughnuts of each run were immersed in sugar to determine the weight of "Sugar Pick-Up" and then these doughnuts were set aside for the time indicated. After the indicated time, the appearance of the sugar coated doughnuts was observed and scored, the scoring appearing in the horizontal column designated "Sugar Retention."

The keeping and eating quality of the doughnuts of each run were determined by a taste panel at the intervals indicated under the heading "SCORE." A doughnut from each of two or more runs for each example were sampled by each member of the panel and given relative scores on the basis of 16 points for a first place vote, 8 points for a second place vote, 4 points for a third place vote and 2 points for a fourth place vote. Thus if there was only two runs being compared, there was only first and second places, the total points for the first and second place vote for the run being totaled and set forth.

As may be noted from the totals of the scores for various days, the number of members of the panels were not always the same.

It is to be noted that a doughnut may have a good "Score" (eating quality) and be a poor performer (poor frying characteristics such as absorbs too muuh fat); or vice versa.

Also for convenience, for each run, the percent of rye flour to total rye and wheat flour ("Rye Flour/Total Rye & Wheat Flour") has been set forth as well as the percent of rye flour in a fully prepared mix, and the percent of the total weight of emulsifier to the weight of the fully prepared mix.

For the various flours used in the following examples, the percent of ash and protein on a 14% moisture basis are given in Table A below.

TABLE A

| Flour | Moisture, percent | Ash, percent | Protein, percent |
| --- | --- | --- | --- |
| Yellow hard wheat [1] | 10.8 | 0.47 | 9.80 |
| Spring wheat | 13.2 | 0.41 | 12.60 |
| Soft red wheat | 13.0 | 0.38 | 9.50 |
| Soft white wheat | 11.2 | 0.37 | 9.10 |
| White rye | 11.8 | 0.55 | 8.40 |

[1] Yellow hard wheat flour is conventionally used in making cake doughnuts.

For the examples, the "Other Ingredients" are those from either below Table B or Table C as indicated in the table for the respective example.

TABLE B

| | Percent |
|---|---|
| Soy flour | 2.00 |
| Potato flour | 1.00 |
| Sucrose | 26.00 |
| Dextrose | 1.15 |
| Soy oil | 4.05 |
| Milk powder | 2.70 |
| Salt | 1.00 |
| Soda | 0.84 |
| Color mix | 0.35 |
| Pyrophosphate | 1.16 |
| Total "Other Ingredients" | 40.25 |

For example for Run 1, the total ingredient of the base total 100% while the weight of sugar and water added to the base was 88% of the weight of the base. The composition of the Bases, the amount of sugar and water added to prepare the respective batter, and the results of the testing of the cake doughnuts prepared from the respective batter are given below in Table 1.

As illustrative of a "Fully Prepared Mix" as used in this application, referring to Run 1, the fully prepared mix includes the "Ingredients of Base" plus sugar. Thus, to determine the relative amount of each ingredient to a Fully Prepared Mix, the figure given for each ingredient would be divided by 134.

TABLE 1

| Run | 1 | 2 | 3 | 4 | 5 | 6 |
|---|---|---|---|---|---|---|
| Ingredients of Base, Percent: | | | | | | |
| Yellow Hard Wheat Flour | 79.72 | 78.72 | 74.72 | 69.72 | 59.72 | |
| White Rye Flour | | 1.00 | 5.00 | 10.00 | 20.00 | 79.72 |
| Lecithin | 0.40 | 0.40 | 0.40 | 0.40 | 0.40 | 0.40 |
| PGME [1] | 0.75 | 0.75 | 0.75 | 0.75 | 0.75 | 0.75 |
| Other Ingredients (Table C) | 19.13 | 19.13 | 19.13 | 19.13 | 19.13 | 19.13 |
| Total Base | 100.00 | 100.00 | 100.00 | 100.00 | 100.00 | 100.00 |
| Added to Base, Percent: | | | | | | |
| Water | 54 | 54 | 55 | 59 | 65 | 71 |
| Sugar | 34 | 34 | 34 | 34 | 34 | 34 |
| Results: | | | | | | |
| Fat Absorption (oz./doz.) | 2.50 | 2.30 | 2.10 | 2.00 | 2.00 | 2.00 |
| Height (mm.) | 173 | 178 | 176 | 173 | 174 | 136 |
| Spread (mm.) | 410 | 410 | 411 | 413 | 410 | 465 |
| Specific Volume (cc.) | 3.15 | 3.17 | 3.14 | 3.18 | 3.16 | 2.84 |
| Performance | G. | V.G. | V.G. | V.G.E. | V.G.E. | P. |
| Sugar Pick up (gms.) | 65 | 66 | 63 | 60 | 60 | |
| Sugar Retention (24 hrs.-93° F.) | F. | F. | G. | | P. | |
| Rye Flour/Total Rye and Wheat Flour, Percent | 0 | 1.25 | 6.15 | 12.54 | 25.09 | 100.00 |
| Percent Rye Flour in Mix | 0 | 0.75 | 3.73 | 7.46 | 14.92 | 59.42 |
| Percent Emulsifier in Mix | 0.86 | 0.86 | 0.86 | 0.86 | 0.86 | 0.86 |

[1] Abbreviation for propylene glycol fatty acid esters and mono- and diglycerides.

TABLE C

| | Percent |
|---|---|
| Soy flour | 3.00 |
| Potato flour | 0.65 |
| Dextrose | 0.50 |
| Soy oil | 4.70 |
| Milk powder | 3.60 |
| Egg yolk (solids) | 2.00 |
| Salt | 1.35 |
| Soda | 1.22 |
| Pyrophosphate | 0.85 |
| Sodium aluminum | 0.61 |
| Color mix | 0.40 |
| Sodium propionate | 0.25 |
| Total "Other Ingredients" | 19.13 |

EXAMPLE 1

A series of cake doughnut bases were made wherein various quantities of rye flour were used in place of a corresponding amounts of wheat flour that is conventionally used in making cake doughnuts, and were compared against a conventional cake doughnut of Run 1. The Base and/or Fully Prepared Mix of Run 1 are conventional. To each of these bases there was added water and sugar in the quantities indicated, and then the resulting mixture was admixed to form a cake doughnut batter. The batters were then processed to form finished doughnuts, including frying in the previously indicated type of machine, and the various tests made such as indicated above.

SCORE

| | 3 Days | 6 Days |
|---|---|---|
| Run: | | |
| 1 | 22 | 42 |
| 2 | 34 | 30 |
| 3 | 80 | 48 |
| 4 | 44 | 120 |
| Total | 180 | 240 |

With reference to Run 6, which had no wheat flour, it was a very poor quality doughnut and definitely not of marketable quality. At the end of 3 days, the doughnuts of runs 2, 3 and 4 showed better taste and eating qualities than the control (Run 1) in which no rye flour was used, this showing that incorporating a limited amount of rye flour in a cake doughnut mix definitely improved the keeping quality of cake doughnuts. At the end of six days, the doughnuts of Run 4 were still outstandingly soft and moist. Further the utilization of rye flour decreased the amount of fat absorbed by the doughnuts during frying from that absorbed by the control.

EXAMPLE 2

Using the same cake doughnut formula that was used in Example 1, a number of runs were made using different types of wheat flours, with and without being blended with rye flour. The mixes used, including the amounts of water and sugar added to the mixes, and results of the doughnuts made in accordance with the manner set forth in Example 1 are given below in Table 2. Run 7 was made of conventional ingredients in conventional amounts to provide a basis of comparison.

TABLE 2

| Run | 7 | 8 | 9 | 10 | 11 | 12 | 13 | 14 |
|---|---|---|---|---|---|---|---|---|
| Ingredients of Base, Percent: | | | | | | | | |
| Yellow Hard Wheat Flour | 79.72 | 59.72 | | | | | | |
| Spring Wheat Flour | | | 79.72 | 59.72 | | | | |
| Soft Red Wheat Flour | | | | | 79.72 | 59.72 | | |
| Soft White Wheat Flour | | | | | | | 79.72 | 59.27 |
| White Rye Flour | | 20.00 | | 20.00 | | 20.00 | | 20.75 |
| Lecithin | 0.40 | 0.40 | 0.40 | 0.40 | 0.40 | 0.40 | 0.40 | 0.40 |
| PGME | 0.75 | 0.75 | 0.75 | 0.75 | 0.75 | 0.75 | 0.75 | 0.75 |
| Other Ingredients (Table C) | 19.13 | 19.13 | 19.13 | 19.13 | 19.13 | 19.13 | 19.13 | 19.13 |
| Total | 100.00 | 100.00 | 100.00 | 100.00 | 100.00 | 100.00 | 100.00 | 100.00 |
| Added to Base, Percent: | | | | | | | | |
| Water | 55 | 58 | 55 | 58 | 50 | 52 | 49 | 51 |
| Sugar | 34 | 34 | 34 | 34 | 34 | 34 | 34 | 34 |
| Results: | | | | | | | | |
| Fat Absorption (oz./doz.) | 2.30 | 2.00 | 1.90 | 1.70 | 3.00 | 2.40 | 3.45 | 2.30 |
| Height (mm.) | 1.80 | 1.76 | 1.55 | 1.75 | 1.65 | 1.70 | 1.58 | 1.70 |
| Spread (mm.) | 410 | 410 | 420 | 412 | 430 | 415 | 430 | 410 |
| Specific volume (cc.) | 3.30 | 3.25 | 3.06 | 3.31 | 3.00 | 3.15 | 2.97 | 3.07 |
| Performance | G. | V.G. | P. | V.G. | G. | V.G. | F. | V.G. |
| Percent Moisture of Doughnut at 5 days | 23.45 | 26.09 | 24.90 | 25.82 | 21.34 | 22.05 | 20.07 | 23.02 |
| Rye Flour/Total of Rye and Wheat Flour, Percent | 0 | 25.08 | 0 | 25.08 | 0 | 25.08 | 0 | 25.08 |
| Percent Rye Flour in Mix | 0 | 14.92 | 0 | 14.92 | 0 | 14.92 | 0 | 14.92 |
| Percent Emulsifier in Mix | 0.86 | 0.86 | 0.86 | 0.86 | 0.86 | 0.86 | 0.86 | 0.86 |

SCORE

| Run: | 2 Days | 5 Days |
|---|---|---|
| 7 | 88 | 72 |
| 8 | 104 | 120 |
| Total | 192 | 192 |
| 7 | 64 | 44 |
| 9 | 48 | 60 |
| 10 | 104 | 120 |
| Total | ¹216 | 224 |
| 7 | 52 | 60 |
| 11 | 60 | 36 |
| 12 | 112 | 128 |
| Total | 224 | 224 |
| 7 | 80 | 72 |
| 13 | 32 | 40 |
| 14 | 112 | 112 |
| Total | 224 | 224 |

¹ Total should be 224—unknown error in totaling score for one of the runs.

The blending of rye flour with conventional doughnut flour (Run 8) and with each of the other wheat flours resulted in improved performance. Also the doughnuts made from a rye blended flour had better eating and keeping qualities than those made from the respective wheat flour that did not include rye flour, including the control (Run 7).

With reference to Run 9, it had a high slow-break, and crusted over at the turner during the frying process, while Run 13 had a high, slow-break and high fat absorption. Also as may be noted from Table 2, the amount of water used in each of the runs to provide the desired (same) viscosity of batter in each of the runs using wheat-rye flour was greater than the respective run of the corresponding wheat flour that had no rye flour blended therein. Likewise, the fat absorption for each of the non-rye flour mixes was higher than the corresponding blended wheat rye flour mix. Further the performance of each of the runs using wheat-rye flour was better than the respective run of the corresponding wheat flour that had no rye flour blended therein.

Also the tenderness and keeping quality ("SCORE") of each of the runs using a wheat-rye blended flour was improved considerably over that of the corresponding run that did not include rye flour in the mix. Also as shown by a comparison of the "SCORE" of Runs 10, 12 and 14 with Run 7, wheat flours that normally are not satisfactory for making cake doughnuts, when blended with rye flour in accordance with this invention, provided cake doughnuts that were of considerably better tenderness and keeping quality than a conventional cake doughnut wheat flour (Run 7) that had not been blended with rye flour.

EXAMPLE 3

Using the same cake doughnut formula that was used in Example 1, a number of runs were made using different proportions of white rye flour blended in with spring wheat flour; one run, Run 15, being a control using conventional cake doughnut wheat flour with conventional amounts of other ingredients. The bases including the amounts of sugar added which would yield a fully prepared mix, the amount of water added to prepare a batter, and the results of testing of the cake doughnuts made are given below in Table 3.

TABLE 3

| Run | 15 | 16 | 17 | 18 | 19 | 20 | 21 | 22 |
|---|---|---|---|---|---|---|---|---|
| Ingredients of Base, Percent: | | | | | | | | |
| Yellow Hard White Flour | 79.72 | | | | | | | |
| Spring Wheat Flour | | 79.72 | 69.72 | 64.72 | 59.72 | 54.72 | 49.72 | 44.72 |
| White Rye Flour | | | 10.00 | 15.00 | 20.00 | 25.00 | 30.00 | 35.00 |
| Lecithin | 0.40 | 0.40 | 0.40 | 0.40 | 0.40 | 0.40 | 0.40 | 0.40 |
| PGME | 0.75 | 0.75 | 0.75 | 0.75 | 0.75 | 0.75 | 0.75 | 0.75 |
| Other Ingredients (Table C) | 19.13 | 19.13 | 19.13 | 19.13 | 19.13 | 19.13 | 19.13 | 19.13 |
| Total | 100.00 | 100.00 | 100.00 | 100.00 | 100.00 | 100.00 | 100.00 | 100.00 |
| Added to Base, Percent: | | | | | | | | |
| Water | 55 | 55 | 56 | 57 | 58 | 59 | 60 | 61 |
| Sugar | 34 | 34 | 34 | 34 | 34 | 34 | 34 | 34 |
| Results: | | | | | | | | |
| Fat Absorption (oz./doz.) | 2.50 | 1.85 | 1.80 | 1.75 | 1.60 | 1.60 | 1.50 | 1.50 |
| Height (mm.) | 175 | 165 | 178 | 178 | 180 | 174 | 167 | 162 |
| Spread (mm. per 6) | 412 | 414 | 412 | 410 | 410 | 410 | 410 | 410 |
| Specific Volume (c.c.) | 3.24 | 3.10 | 3.22 | 3.28 | 3.10 | 3.01 | 2.91 | 2.80 |
| Performance | V.G. | P. | G. | V.G. | V.G. | V.G. | G. | F. |
| Sugar Pick Up (gms./doz.) | 50 | 54 | 52 | 53 | 51 | 52 | 52 | 52 |
| Sugar Retention (5 days) | F. | F. | G. | V.G. | V.G. | G. | G. | F. |
| Rye Flour/Total Rye and Wheat Flour, Percent | 0 | 0 | 12.54 | 18.82 | 25.09 | 31.36 | 37.76 | 43.90 |
| Percent Rye Flour in Mix | 0 | 0 | 7.46 | 11.19 | 14.92 | 18.73 | 22.39 | 26.12 |
| Percent Emulsifier in Mix | 0.86 | 0.86 | 0.86 | 0.86 | 0.86 | 0.86 | 0.86 | 0.86 |

SCORE

| | 2 Days | 5 Days |
|---|---|---|
| Run: | | |
| 15 | 22 | 14 |
| 16 | 66 | 32 |
| 18 | 76 | 96 |
| 19 | 76 | 68 |
| Total | 240 | 210 |
| 15 | 16 | 14 |
| 20 | 80 | 44 |
| 21 | 80 | 96 |
| 22 | 64 | 56 |
| Total | 240 | 210 |

Run 15 (control) was a very good performer while Run 16 had a good break but crusted over at the turner while Run 18 was a very good performer and held gas well. Run 19 was like Run 18, while Run 20 was like Run 18 other than being tighter doughnuts. Run 21 was a good performer but it held gas too well and as a result was too tight a doughnut, while Run 22 did not have enough expansion.

As may be noted from Runs 16 and 17, the performance of spring wheat flour was greatly improved by blending 10% white rye flour (per cent of the base) in place of the corresponding amount of wheat flour; i.e. performance went from poor to good. Also to be noted is that for these runs, the fat absorption was considerably lower than the control. However, in the panel test for tenderness and eating quality, the control was the poorest. Also, the column for Runs 17 and 18 were very close to that of the control.

EXAMPLE 4

Using the same cake doughnut formula that was used in Example 1, a number of runs were made using different proportions of white rye flour with soft white wheat flour, Run 23 being a control using conventional cake doughnut wheat flour with other conventional ingredients in conventional amounts. The Bases, including the amounts of sugar required to prepare a fully prepared mix, the amount of water added to prepare a batter, and the results of testing of the cake doughnuts made are given below in Table 4.

SCORE

| | 3 Days | 5 Days |
|---|---|---|
| Run: | | |
| 23 | 74 | 50 |
| 24 | 32 | 18 |
| 25 | 108 | 100 |
| 26 | 56 | 72 |
| Total | 270 | 240 |

With reference to Run 23 (control) it was a very good performer while Run 24 (soft white wheat flour with no rye blended therewith) had a high break and excessive spread. Further Run 24, even with the high fat absorption, was the poorest eating and keeping doughnut of these runs. The doughnuts of Run 24 even when first made were very dry, crumbly and tough. However utilizing white rye flour in place of a corresponding amount of soft white wheat flour greatly improved the doughnuts obtained wherein soft wheat flour constituted the greatest single ingredient portion of the fully prepared mix used to make the doughnuts.

Run 25 had a positive break and held gas very well while the break of Run 26 was a little high. Run 25 was better in all respects than the control other than the control had a better volume. In a different run (not shown), the addition of 10% white rye flour (percent of the Base), the fat absorption was cut and even though the performance was poor, it was an improvement over Run 24.

With reference to blending white rye flour with soft white wheat flour, as the percent of rye increased, water absorption qualities of the batter increased and fat absorption decreased. Further, as the percent of rye increased, the volume increased and performance improved until about the 20% level of rye (percent of the Base) was reached and then a downhill trend began.

EXAMPLE 5

Using the same cake doughnut formula as used in Example 1, a number of runs were made to find out the effect of using medium rye flour, and mixtures of medium rye and white rye flour in making cake doughnuts. The amounts of medium rye and medium rye-white rye flour used are given below in Table 5, Run 27 being a control using a conventional cake doughnut wheat flour with other conventional ingredients in conventional amounts. The amount of sugar added to obtain a fully prepared mix, the amount of water added to prepare a

TABLE 4

| Run | 23 | 24 | 25 | 26 |
|---|---|---|---|---|
| Ingredients of Base, percent: | | | | |
| Yellow Hard Wheat Flour | 79.22 | | | |
| Soft White Wheat Flour | | 79.22 | 59.72 | 54.72 |
| White Rye Flour | | | 20.00 | 25.00 |
| Lecithin | 0.40 | 0.40 | 0.40 | 0.40 |
| PGME | 0.75 | 0.75 | 0.75 | 0.75 |
| Other Ingredients (Table C) | 19.13 | 19.13 | 19.13 | 19.13 |
| Total Base | 100.00 | 100.00 | 100.00 | 100.00 |
| Added to Base, percent: | | | | |
| Water | 54 | 48 | 50 | 51 |
| Sugar | 34 | 34 | 34 | 34 |
| Results: | | | | |
| Fat Absorption (oz./doz.) | 2.60 | 3.85 | 2.40 | 2.40 |
| Height (mm.) | 175 | 152 | 166 | 162 |
| Spread (mm. per 6) | 413 | 430 | 410 | 140 |
| Specific Volume (cc.) | 3.25 | 2.80 | 3.00 | 2.90 |
| Performance | V.G. | P. | V.G. | G. |
| Sugar Pick Up (gms./doz.) | 63 | 79 | 63 | 58 |
| Sugar Retention (3 days) | F. | G. | V.G. | V.G. |
| Rye Flour/Total Rye to Wheat Flour, percent | 0 | 0 | 25.09 | 31.36 |
| Percent Rye Flour in Mix | 0 | | 14.920 | 18.75 |
| Percent Emulsifier in Mix | 0.86 | 0.86 | 0.86 | 0.86 | batter and the results of testing the doughnuts made are also given in Table 5.

TABLE 5

| Run | 27 | 28 | 29 | 30 | 31 | 32 | 33 |
|---|---|---|---|---|---|---|---|
| Ingredients of Base, Percent: | | | | | | | |
| Yellow Hard Wheat Flour | 79.22 | 69.22 | 64.22 | 59.22 | 59.22 | 54.22 | 49.22 |
| Medium Rye Flour | | 10.00 | 15.00 | 20.00 | 10.00 | 15.00 | 20.00 |
| White Rye Flour | | | | | 10.00 | 10.00 | 10.00 |
| Lecithin | 0.40 | 0.40 | 0.40 | 0.40 | 0.40 | 0.40 | 0.40 |
| PGME | 0.75 | 0.75 | 0.75 | 0.75 | 0.75 | 0.75 | 0.75 |
| Other Ingredients (Table C) | 19.13 | 19.13 | 19.13 | 19.13 | 19.13 | 19.13 | 19.13 |
| Total Base | 100.00 | 100.00 | 100.00 | 100.00 | 100.00 | 100.00 | 100.00 |
| Added to Base, Percent: | | | | | | | |
| Water | 54 | 61 | 64 | 68 | 62 | 65 | 69 |
| Sugar | 34 | 34 | 34 | 34 | 34 | 34 | 34 |
| Results: | | | | | | | |
| Fat Absorption (oz./doz.) | 2.60 | 2.00 | 1.95 | 1.60 | 17.5 | 1.80 | 1.50 |
| Height (m.m.) | 174 | 175 | 172 | 170 | 168 | 170 | 165 |
| Spread (m.m. per 6) | 410 | 410 | 410 | 412 | 415 | 415 | 415 |
| Specific Volume (cc.) | 3.18 | 3.18 | 3.12 | 3.05 | 3.20 | 3.10 | 3.05 |
| Performance | V.G. | V.G. | G. | G. | V.G. | V.G. | F. |
| Sugar Pick Up (gms./doz.) | 61 | 50 | 45 | 50 | 49 | 49 | 46 |
| Sugar Retention (3 days) | V.G. | G. | F. | F. | P. | P. | P. |
| Rye Flour/Total Rye and Wheat Flour, percent | 0 | 12.54 | 18.82 | 25.09 | 25.09 | 31.36 | 37.76 |
| Percent Rye Flour in Mix | 0 | 7.46 | 11.19 | 14.92 | 14.92 | 18.73 | 22.39 |
| Percent Emulsifier in Mix | 0.86 | 0.86 | 0.86 | 0.86 | 0.86 | 0.86 | 0.86 |

SCORE

| Run: | Days |
|---|---|
| 27 | 18 |
| 28 | 68 |
| 29 | 88 |
| 30 | 96 |
| Total | 270 |
| 27 | 24 |
| 31 | 104 |
| 32 | 34 |
| 33 | 108 |
| Total | 270 |

It has been found that medium rye flour does impart very good moisture retaining properties and excellent eating and keeping qualities. However even at the 10% level (based on the Base), the medium rye flour makes the doughnut crumb color very brown and imparts a strong rye flavor.

EXAMPLE 6

Using a different cake doughnut formula than that used in the preceding examples, test runs were made to determine the effect of blending a portion of rye flour in place of conventional cake doughnut wheat flour; and to determine the effect of using an increased amount of emulsifier in making a rye-wheat flour blend cake doughnut. The Bases of this example in part differs in that all the sugar was included in the Bases but no egg or egg solids were included therein. Rather water and sugar yolk were added to the base in making a batter, the sugar yolk being 40% water, 10% sugar and 50% egg yolk solids. The compositions of the base, the amount of water and sugar yolk added, and the results of the runs are given below in Table 6.

As believed apparent, if each base was prepared as a "Fully Prepared Mix," the 50% egg yolk solids and 10% sugar would be included with the "Ingredients of the Base." Run 34 was a control using conventional doughnut wheat flour with other conventional ingredients in conventional amounts.

TABLE 6

| Run | 34 | 35 | 36 |
|---|---|---|---|
| Ingredients of Base, Percent: | | | |
| Yellow Hard Wheat Flour | 59.25 | 47.40 | 47.00 |
| White Rye Flour | | 11.85 | 11.75 |
| Lecithin | 0.25 | 0.25 | 0.25 |
| PGME | 0.25 | 0.25 | 0.75 |
| Other Ingredients (Table B) | 40.25 | 40.25 | 40.25 |
| Total | 100.00 | 100.00 | 100.00 |
| Added to Base, Percent: | | | |
| Water | 40 | 42 | 42 |
| Sugar Yolk | 4 | 4 | 4 |
| Results: | | | |
| Fat Absorption (oz./doz.) | 2.20 | 2.00 | 2.20 |
| Height (mm.) | 167 | 172 | 170 |
| Spread (mm.) | 413 | 412 | 412 |
| Specific Volume (cc.) | 2.97 | 3.02 | 3.11 |
| Pressure | 3½–3¾ | 3½–3¾ | 3⅜–3½ |
| Performance | G. | V.G. | V.G. |
| Sugar Pick Up (gms./doz.) | 57 | 58 | 59 |
| Sugar Retention (4 days) | V.G. | G. | V.G. |
| Rye Flour/Total Wheat Rye Flour, percent | 0 | 20 | 19.65 |
| Percent Rye in Mix | 0 | 11.39 | 11.30 |
| Percent Emulsifier in Mix | 0.48 | 0.48 | 0.96 |

SCORE

| | 24 hrs. | 3 Days |
|---|---|---|
| Run: | | |
| 34 | 72 | 88 |
| 36 | 120 | 128 |
| Total | 192 | 216 |
| | 48 hrs. | 4 Days |
| 34 | 44 | 44 |
| 35 | 60 | 64 |
| 36 | 120 | 144 |
| Total | 224 | 252 |

As may be noted from Table 6, 2% more water was required for the rye-wheat flour blends than the control (Run 34) to provide batters of the same viscosity. Additionally, by using approximately 80% wheat flour—20% rye flour blend rather than 100% wheat flour, the cake doughnuts tolerated a 50% increase in emulsifier without any increase of fat absorption and were of better quality. However it is to be noted that without the 50% additional emulsifier, a better quality cake doughnut was obtained where the only change in the mix was using about 20% rye flour in place of a corresponding amount of conventional cake doughnut wheat flour in the base.

EXAMPLE 7

Using the same cake doughnut formulation as Example 1 and in accordance with the procedure of Example 1, a series of runs were made in which the amount of PGME was varied from 0% of the Base to 1.50% of the Base, the variation of the total amount of emulsifier in a fully prepared mix being varied from 0.0% to 1.42%. As present in Table 7, each run including two separate Bases which were made into doughnuts and tested, i.e., an A run and a B run, each of the A run Bases did not include any rye flour while each of the B run mixes included 20% rye flour (based on the Base).

As the A series, the doughnuts of Runs 37–40 in frying gassed out slightly, while for Runs 41 and 42 the doughnuts gassed out, spread and had a slightly high break. Run 43A was like Runs 41A, 42A other than there was some breaking in the second side fried. This did not occur with the B series other than Run 43B started to spread.

As shown under "Results" in Table 7, for each run, the B Base doughnuts absorbed considerably less fat than the corresponding A Base doughnuts which did not con-

TABLE 7

| Run | 37 | 38 | 39 | 40 | 41 | 42 | 43 |
|---|---|---|---|---|---|---|---|
| Ingredients of Base, Percent: | | | | | | | |
| Yellow Hard Wheat Flour: | | | | | | | |
|   A Series | 80.47 | 80.22 | 79.97 | 79.72 | 79.47 | 79.22 | 78.97 |
|   B Series | 60.47 | 60.22 | 59.97 | 59.72 | 59.47 | 59.22 | 58.97 |
| White Rye Flour (B Series) (each of A and B Series) | 20.00 | 20.00 | 20.00 | 20.00 | 20.00 | 20.00 | 20.00 |
| Lecithin | 0.40 | 0.40 | 0.40 | 0.40 | 0.40 | 0.40 | 0.40 |
| PGME | | 0.25 | 0.50 | 0.75 | 1.00 | 1.25 | 1.50 |
| Other Ingredients (Table C) | 19.13 | 19.13 | 19.13 | 39.13 | 19.13 | 19.13 | 19.13 |
| Total Base (each of A and B Series) | 100.00 | 100.00 | 100.00 | 100.00 | 100.00 | 100.00 | 100.00 |
| Added to Base, Percent: | | | | | | | |
| Water: | | | | | | | |
|   A Series | 57 | 57 | 56 | 56 | 55 | 55 | 55 |
|   B Series | 59 | 59 | 58 | 58 | 58 | 58 | 58 |
| Sugar (each of A and B Series) | 34 | 34 | 34 | 34 | 34 | 34 | 34 |
| Results: | | | | | | | |
| Fat Absorption (oz./doz.): | | | | | | | |
|   A Series | 2.10 | 2.10 | 2.20 | 2.35 | 2.50 | 2.65 | 3.00 |
|   B Series | 1.65 | 1.80 | 1.80 | 1.95 | 1.95 | 2.10 | 2.40 |
| Height (mm.): | | | | | | | |
|   A Series | 175 | 182 | 184 | 183 | 179 | 180 | 180 |
|   B Series | 180 | 180 | 177 | 178 | 175 | 175 | 175 |
| Spread (mm.): | | | | | | | |
|   A Series | 416 | 415 | 415 | 415 | 420 | 422 | 425 |
|   B Series | 415 | 415 | 415 | 415 | 415 | 415 | 420 |
| Specific Volume (cc.): | | | | | | | |
|   A Series | 3.32 | 3.30 | 3.29 | 3.23 | 3.33 | 3.31 | 3.22 |
|   B Series | 3.25 | 3.30 | 3.22 | 3.22 | 3.26 | 3.25 | 3.26 |
| Performance: | | | | | | | |
|   A Series | G. | G. | G. | G. | F. | F. | F. |
|   B Series | V.G. | V.G. | V.G. | V.G. | V.G. | V.G. | G. |
| Sugar Pick Up (gms./doz.): | | | | | | | |
|   A Series | 49 | 48 | 47 | 52 | 48 | 54 | 56 |
|   B Series | 39 | 38 | 43 | 42 | 42 | 51 | 50 |
| Sugar Retention: | | | | | | | |
|   A Series | F. | F. | F. | F. | F. | G. | G. |
|   B Series | P. | P. | F. | G. | G. | G. | F. |
| Rye Flour/Total Wheat and Rye Flour (B Series) | 24.85 | 24.93 | 25.01 | 25.09 | 25.17 | 25.25 | 25.36 |
| Percent Rye Flour in Base (B Series) | 14.92 | 14.92 | 14.92 | 14.92 | 14.92 | 14.92 | 14.92 |
| Percent Emulsifier in Mix | 0.29 | 0.49 | 0.67 | 0.85 | 1.04 | 1.23 | 1.42 |

| SCORE | 3 Days | 4 Days |
|---|---|---|
| Run: | | |
| 37A | 88 | 64 |
| 37B | 104 | 128 |
| Total | 192 | 192 |
| 40A | 72 | 64 |
| 40B | 120 | 128 |
| Total | 192 | 192 |
| 43A | 64 | 64 |
| 43B | 128 | 128 |
| Total | 192 | 192 |
| 38A | 72 | 64 |
| 38B | 120 | 128 |
| Total | 192 | 192 |
| 41A | 64 | 64 |
| 41B | 128 | 128 |
| Total | 192 | 192 |
| 39A | 64 | 64 |
| 39B | 128 | 128 |
| Total | 192 | 192 |
| 42A | 64 | 64 |
| 42B | 128 | 128 |
| Total | 192 | 192 | tain any rye flour. Likewise for each run, the B Base performed better, and had a substantially better Score on the taste panel eating quality tests.

The break of the doughnuts for all the A series Bases was slightly higher than the corresponding B series Base. Also on the basis of the tests of this example, a cake doughnut base having no rye flour can tolerate a maximum of approximately 0.75% PGME (on the basis of the Base) while the rye-wheat third flour Base can tolerate a maximum of about 1.25%, i.e. 66⅔% more PGME, or about 43% more emulsifier.

EXAMPLE 8

A series of Runs were made similar to Run 7, other than only lecithin was used as an emulsifier to determine the optimun amount of lecithin that can be used in cake doughnut bases that have and that do not have rye flour. The formula used was the same as that used in Example 1 (other than for the emulsifier), with the amount of lecithin being varied from 0.40% to 2.00% of the base, the data for the runs being set worth below in Table 8.

TABLE 8

| Run | 44 | 45 | 46 | 47 | 48 | 49 | 50 | 51 |
|---|---|---|---|---|---|---|---|---|
| Ingredients of Base, Percent: | | | | | | | | |
| Yellow Hard Wheat Flour: | | | | | | | | |
| A Series | 80.47 | 80.27 | 80.12 | 79.87 | 79.62 | 79.37 | 79.12 | 78.87 |
| B Series | 20.00 | 20.00 | 20.00 | 20.00 | 20.00 | 20.00 | 20.00 | 20.00 |
| White Rye Flour (B Series) | 60.47 | 60.27 | 60.12 | 59.87 | 59.62 | 59.37 | 59.12 | 58.87 |
| Lecithin (each of A and B Series) | 0.40 | 0.60 | 0.75 | 1.00 | 1.25 | 1.50 | 1.75 | 2.00 |
| Other Ingredients (Table C) | 19.13 | 19.13 | 19.13 | 19.13 | 19.13 | 19.13 | 19.13 | 19.13 |
| Total Base (each of A and B Series) | 100.00 | 100.00 | 100.00 | 100.00 | 100.00 | 100.00 | 100.00 | 100.00 |
| Added to Base, Percent: | | | | | | | | |
| Water: | | | | | | | | |
| A Series | 55 | 55 | 55 | 55 | 55 | 55 | 55 | 55 |
| B Series | 59 | 59 | 59 | 59 | 59 | 59 | 59 | 59 |
| Sugar (each of A and B Series) | 34 | 34 | 34 | 34 | 34 | 34 | 34 | 34 |
| Results: | | | | | | | | |
| Fat Absorption (oz./doz.): | | | | | | | | |
| A Series | 2.30 | 2.35 | 2.40 | 2.60 | 3.00 | 3.25 | 3.95 | 4.10 |
| B Series | 1.80 | 1.90 | 2.00 | 2.20 | 2.55 | 2.75 | 3.40 | 3.50 |
| Height: | | | | | | | | |
| A Series | 181 | 181 | 182 | 182 | 182 | 178 | 172 | 170 |
| B Series | 178 | 176 | 176 | 173 | 175 | 174 | 170 | 172 |
| Spread (mm.): | | | | | | | | |
| A Series | 411 | 416 | 423 | 423 | 426 | 429 | 435 | 438 |
| B Series | 414 | 416 | 420 | 424 | 423 | 425 | 428 | 430 |
| Specific Volume (cc.): | | | | | | | | |
| A Series | 3.21 | 3.31 | 3.33 | 3.33 | 3.32 | 3.31 | 3.24 | 3.23 |
| B Series | 3.11 | 3.18 | 3.27 | 3.21 | 3.24 | 3.21 | 3.23 | 3.22 |
| Performance: | | | | | | | | |
| A Series | V.G. | V.G. | G. | G. | F. | F. | F. | P. |
| B Series | V.G. | V.G. | V.G. | G. | G. | F. | F. | F. |
| Sugar Pick Up (gms./doz.): | | | | | | | | |
| A Series | 49 | 50 | 56 | 53 | 57 | 60 | 70 | 69 |
| B Series | 44 | 44 | 47 | 48 | 54 | 62 | 59 | 60 |
| Sugar Retention (5 days): | | | | | | | | |
| A Series | F. | G. | G. | V.G. | V.G. |  | G. | F. |
| B Series | F. | G. | V.G. | V.G. |  | V.G. | G. | G. |
| Rye Flour Wheat and Rye Flour (Series B), percent | 24.85 | 24.89 | 24.95 | 25.04 | 25.12 | 15.20 | 25.28 | 25.36 |
| Percent Rye Flour in Mix | 14.92 | 14.92 | 14.92 | 14.92 | 14.92 | 14.92 | 14.92 | 14.92 |
| Percent Emulsifier in Mix (each Series) | 0.29 | 0.42 | 0.56 | 0.75 | 0.93 | 1.12 | 1.30 | 1.49 |

| SCORE | 3 Days | 5 Days |
|---|---|---|
| Run: | | |
| 44A | 88 | 64 |
| 44B | 104 | 128 |
| Total | 192 | 192 |
| 47A | 80 | 64 |
| 47B | 112 | 128 |
| Total | 192 | 192 |
| 50A | 88 | 64 |
| 50B | 104 | 128 |
| Total | 192 | 192 |
| 45A | 72 | 72 |
| 45B | 120 | 120 |
| Total | 192 | 192 |
| 48A | 80 | 80 |
| 48B | 112 | 112 |
| Total | 192 | 192 |
| 51A | 80 | 80 |
| 51B | 112 | 112 |
| Total | 192 | 192 |
| 46A | 72 | 64 |
| 46B | 120 | 128 |
| Total | 192 | 192 |
| 49A | 80 | 64 |
| 49B | 112 | 128 |
| Total | 192 | 192 |

In making the doughnuts, those made from the mix of Run 46A gassed out slightly too far, Run 47A gassed out too far, Runs 48A–51A gassed way out, and the frying fat was foaming with Runs 49A–51A. There was spreading with Runs 47B, 48B, and with Runs 49B, 50B, 51B there was foaming and the doughnuts gassed out too far. In this series of runs, the peak performance obtained using lecithin with a base containing no rye flour .6% lecithin (based on the Base) while that for bases containing rye flour was .75%.

As compared to the A series bases doughnut for each run, the respective B series base doughnuts has considerably less fat absorption absorbed more water in making the batter, held gas better, and showed better eating and keeping qualities.

EXAMPLE 9

A series of runs were made similar to those of Example 8, other than Tween 60 was used in varying amounts from 0.0% (based on mix) to 0.90% instead of lecithin. The data for this series is set forth below in Table 9.

In this series of runs, the doughnuts made in Run 54A gassed out quite far, Runs 55A, 56A spread and gassed way out, and Run 57A showed spread, Run 56B was starting to spread and gassed out too far, and Run 57B spread and gassed out. Higher quantities of Tween 60 (polysorbate 60) caused the doughnuts to gas out excessively, although the rye-white blend flours of doughnuts showed better gas retention qualities than those that contained no rye flour. From this series of runs, 0.3% polysorbate 60 (based on Base) is about the limit for non-rye flour cake doughnut mixes of the Table 7 formulation in making marketable cake doughnuts while 0.7% polysorbate was about the limit for the rye-wheat flour blend doughnut bases.

TABLE 9

| Run | 52 | 53 | 54 | 55 | 56 | 57 |
|---|---|---|---|---|---|---|
| Ingredients of base, percent: | | | | | | |
| Yellow Hard Wheat Flour: | | | | | | |
| A Series | 80.87 | 80.77 | 80.57 | 80.37 | 80.17 | 79.97 |
| B Series | 60.87 | 60.77 | 60.57 | 60.37 | 60.17 | 59.97 |
| White Rye Flour (B Series) (each of A and B Series) | 20.00 | 20.00 | 20.00 | 20.00 | 20.00 | 20.00 |
| Tween 60 [1] | | 0.10 | 0.30 | 0.50 | 0.70 | 0.90 |
| Other Ingredients (Table C) | 19.13 | 19.13 | 19.13 | 19.13 | 19.13 | 19.13 |
| Total (each of A and B Series) | 100.00 | 100.00 | 100.00 | 100.00 | 100.00 | 100.00 |
| Added to Base, Percent: | | | | | | |
| Water: | | | | | | |
| A Series | 55 | 57 | 57 | 56 | 55 | 54 |
| B Series | 59 | 61 | 60 | 60 | 59 | 56 |
| Sugar (each of A and B Series) | 34 | 34 | 34 | 34 | 34 | 34 |
| Results: | | | | | | |
| Fat Absorption (oz./doz.): | | | | | | |
| A Series | 1.25 | 1.65 | 2.65 | 4.35 | 6.10 | 9.00 |
| B Series | 1.00 | 1.20 | 1.90 | 2.65 | 4.20 | 7.40 |
| Height (mm.): | | | | | | |
| A Series | 179 | 178 | 187 | 182 | 160 | 121 |
| B Series | 174 | 175 | 182 | 182 | 172 | 151 |
| Spread (mm.): | | | | | | |
| A Series | 409 | 410 | 148 | 428 | 450 | 530 |
| B Series | 406 | 410 | 416 | 423 | 431 | 457 |
| Specific Volume (cc.): | | | | | | |
| A Series | 3.06 | 3.09 | 3.31 | 3.22 | 2.91 | 2.40 |
| B Series | 3.02 | 3.03 | 3.30 | 3.35 | 3.23 | 2.58 |
| Performance: | | | | | | |
| A Series | V.G. | V.G. | G. | F. | P. | P. |
| B Series | V.G. | V.G. | V.G. | V.G. | G. | P. |
| Sugar Pick Up (gms./doz.): | | | | | | |
| A Series | 48 | 52 | 68 | 73 | 76 | 80 |
| B Series | 37 | 45 | 51 | 58 | 62 | 65 |
| Sugar Retention (5 days): | | | | | | |
| A Series | P. | F. | G. | P. | P. | P. |
| B Series | P. | P. | G. | G. | F. | P. |
| Rye Flour/Total Wheat Rye Flour (Series B) | 24.73 | 24.77 | 24.82 | 24.88 | 24.95 | 25.01 |
| Percent Rye Flour in Mix | 14.92 | 14.92 | 14.92 | 14.92 | 14.92 | 14.92 |
| Percent Emulsifier in Mix (each Series) | 0 | 0.07 | 0.22 | 0.37 | 0.52 | 0.67 |

[1] Tween 60=Trademark of Atlas Chemical Industries, Inc. for polysorbate 60.

SCORE

| | 3 Days | 5 Days |
|---|---|---|
| Run: | | |
| 52A | 80 | 64 |
| 52B | 112 | 128 |
| Total | 192 | 192 |
| 53A | 64 | 80 |
| 53B | 128 | 112 |
| Total | 192 | 192 |
| 54A | 64 | 80 |
| 54B | 128 | 112 |
| Total | 192 | 192 |
| 55A | 80 | 72 |
| 55B | 112 | 120 |
| Total | 192 | 192 |
| 56A | 72 | 72 |
| 56B | 120 | 120 |
| Total | 192 | 192 |
| 57A | 72 | 64 |
| 57B | 120 | 128 |
| Total | 192 | 192 |

The embodiments of the invention in which an exclusive property or privilege is claimed are defined as follows:

1. A fully prepared mix for preparing cake doughnuts, comprising about 58% to 62% flour, from about 20% to 30% sugar, from about 3% to 5% shortening and a leavening agent, said flour including wheat flour and about 3.7% to 25% rye flour on a mix basis.

2. The mix of claim 1 further characterized in that there is provided about 0.5% to 3.0% egg solids and an emulsifier.

3. The mix of claim 2 further characterized in that the rye flour is in an amount of at least about 11% of the mix.

4. The mix of claim 2 further characterized in that the wheat flour is a spring wheat flour.

5. The mix of claim 2 further characterized in that the emulsifier comprises lecithen, propylene glycol fatty acid esters and mono and diglycerides, said emulsifier being in an amount up to about 0.67% on a mix basis.

6. The mix of claim 2 further characterized in that the emulsifier consists of lecithen in an amount up to about 0.56% on a mix basis.

7. The mix of claim 2 further characterized in that the emulsifier consists of a polysorbate in an amount up to about 0.52% on a mix basis.

8. The mix of claim 2 further characterized in that the rye flour is a white rye flour.

9. A fully prepared mix for preparing cake doughnuts comprising white wheat flour, rye flour, the rye flour being in an amount of about 6% to 40% of the total rye and wheat flour and a minimum of about 3.7% on a mix basis, from about 20% to 30% sugar, from about 3% to 5% shortening and a chemical leavening agent.

10. The mix of claim 9 further characterized in that the rye flour is a white rye flour in an amount of at least about 11% of the total rye flour and wheat flour.

11. The mix of claim 10 further characterized in that the rye flour comprises up to about 19% of the mix.

12. In the process of preparing cake doughnuts, admixing a mix comprising white wheat flour, from about 20% to about 30% sugar on a mix basis, from about 3% to about 5% shortening on a mix basis, and a chemical leavening agent, and an amount of water to provide a batter of the desired viscosity, and making cake doughnuts from the batter, the improvement being adding an effective amount of rye flour to the ingredients used for making the batter for substantially improving the keeping and eating qualities of the cake doughnuts made from the batter.

13. The process of claim 12 further characterized in that rye flour comprises up to about 19% of the mix.

14. The process of claim 12 further characterized in that the mix includes from about 0.5% to about 3% egg solids on a mix basis.

15. The process of claim 14 further characterized in that the total rye flour and wheat flour comprises from about 58% to about 62% on a mix basis.

16. The process of claim 14 further characterized in that the mix includes milk solids, egg solids and an edible emulsifier, and that the rye flour is a white rye flour.

17. In a process for improving the eating and keeping qualities of cake doughnuts made from a cake doughnut mix having from about 58% to about 62% flour in a fully prepared cake doughnut mix, the step of incorporating from about 3.7% to about 25% rye flour on a mix basis in the cake doughnut mix as part of the flour.

18. In a process for improving the eating and keeping qualities of cake doughnuts made from a cake doughnut base, the step of incorporating white flour and between about 6% to 40% white rye flour on a total rye and wheat flour basis in the cake doughnut base.

19. The process of claim 18 further characterized in that it includes the steps of incorporating from about 20% to about 30% sugar on a fully prepared mix basis in said base and from about 3% to about 5% shortening on a fully prepared mix basis in said base.

20. The process of claim 19 further characterized in that the amount of rye flour on a total rye and wheat flour basis is between about 18% and 31%.

References Cited

UNITED STATES PATENTS

| | | | |
|---|---|---|---|
| 1,929,829 | 10/1933 | Shroyer | 99—92 |
| 2,401,259 | 5/1946 | Lloyd et al. | 99—94 |
| 3,152,910 | 10/1964 | Sugihara et al. | 99—94 |

OTHER REFERENCES

Dollars in Doughnuts, Procter and Gamble Bakery Service of The Procter and Gamble Co., Cincinnati, Ohio, 1933, pages 7 to 9, 14, 15 and 68 to 70.

RAYMOND N. JONES, Primary Examiner

U.S. Cl. X.R.

99—94

PO-1050
(5/69)

UNITED STATES PATENT OFFICE
CERTIFICATE OF CORRECTION

Patent No. 3,481,745        Dated December 2, 1969

Inventor(s) Alvin F. Borer and John R. Dixon

It is certified that error appears in the above-identified patent and that said Letters Patent are hereby corrected as shown below:

Column 1, line 55, after "quality" insert --cake--.
Column 8, Table 2, Column 14, "20.75" should be --20.00--.
Column 9, Table 4, Column 26, "140" should be --410--; Table 4, column 25, "14.920" should be --14.92--; Table 4, column 26, "18.75" should be --18.73--. Column 11, Table 5, column 31, "17.5" should be --1.75--; Score, "Days" should be --5 Days--.
Column 13, Table 7, column 40, "39.13" should be --19.13--.
Column 15, Table 8, column headed Run, "Rye Flour Wheat" should be --Rye Flour/Total Wheat--; Table 8, column 49, "15.20" shoul be --25.20--. Column 17, Table 9, column 54, "148" should be --418--.

SIGNED AND
SEALED

JUN 23 1970

(SEAL)
Attest:

Edward M. Fletcher, Jr.
Attesting Officer

WILLIAM E. SCHUYLER, JR.
Commissioner of Patents